United States Patent [19]

Tonomura et al.

[11] Patent Number: 5,323,235
[45] Date of Patent: Jun. 21, 1994

[54] ASPECT RATIO CONVERTING APPARATUS AND METHOD

[75] Inventors: Takayoshi Tonomura; Yoshinori Ishii, both of Nagaokakyo, Japan

[73] Assignee: Mitsubishi Denki Kabushiki Kaisha, Toyko, Japan

[21] Appl. No.: 966,369

[22] Filed: Oct. 26, 1992

[30] Foreign Application Priority Data

Oct. 30, 1991 [JP] Japan .................. 3-284879

[51] Int. Cl.$^5$ .............................................. H04N 7/01
[52] U.S. Cl. .................................................. 348/445
[58] Field of Search ...................... 358/140, 11, 22, 12, 358/141; H04N 7/01, 5/46, 5/44

[56] References Cited

U.S. PATENT DOCUMENTS

| | | | |
|---|---|---|---|
| 4,651,208 | 3/1987 | Rhodes et al. | 358/140 |
| 4,729,012 | 3/1988 | Jose et al. | 358/11 |
| 5,068,728 | 11/1991 | Macovski | 358/141 |
| 5,128,747 | 7/1992 | Isnardi et al. | 358/12 |
| 5,134,479 | 7/1992 | Ohishi | 358/140 |
| 5,159,438 | 10/1992 | Rabii | 358/12 |

FOREIGN PATENT DOCUMENTS

| | | |
|---|---|---|
| 292077A | 3/1990 | Japan . |
| 2107080 | 4/1990 | Japan . |
| 2152380 | 6/1990 | Japan . |

Primary Examiner—Victor R. Kostak
Assistant Examiner—Nathan J. Flynn

[57] ABSTRACT

An aspect ratio converting apparatus and method convert a picture having an aspect ratio of 4:3 into a picture having an aspect ratio of 16:9. The cut mode or the wide mode is freely selected in accordance with the state of video signals. When the cut mode is selected, after both end portions of the picture are cut by a predetermined width, the picture is compressed. A side panel image having a predetermined luminance is added to both sides of the compressed picture, thereby producing a picture having a wide aspect ratio. When the wide mode is selected, a side panel image having a predetermined luminance is added to both sides of the compressed picture, thereby producing a picture having a wide aspect ratio. Furher, by detecting the available period in a horizontal scanning period of the picture in which picture information actually exists, it is possible to automatically set the region of the picture which is compressed.

19 Claims, 7 Drawing Sheets

ASPECT RATIO CONVERTING APPARATUS AND METHOD

BACKGROUND OF THE INVENTION

1. Field of the Invention

The present invention relates to an aspect ratio converting apparatus provided in a TV picture display unit and, more particularly, to an aspect ratio converting apparatus adopting a side panel system.

2. Description of the Related Art

In the NTSC system, the aspect ratio of a TV picture is 4:3. However, high definition television (HDTV) has recently been being put to practical use. In HDTV, a wide aspect ratio, namely, an aspect ratio of 16:9 is adopted. In order to display a picture having an aspect ratio of 4:3 in HDTV, it is necessary to convert the aspect ratio from 4:3 to 16:9.

However, if the the aspect ratio is converted at different compression ratios in the horizontal direction and in the vertical direction, the picture is distorted. It is therefore necessary to convert the aspect ratio at the same compression ratio in the horizontal direction and in the vertical direction. For example, when there is a "round" pattern in the picture before conversion, the "roundness" must be maintained after conversion. This condition is sometimes called "maintenance of roundness".

Figure 1:
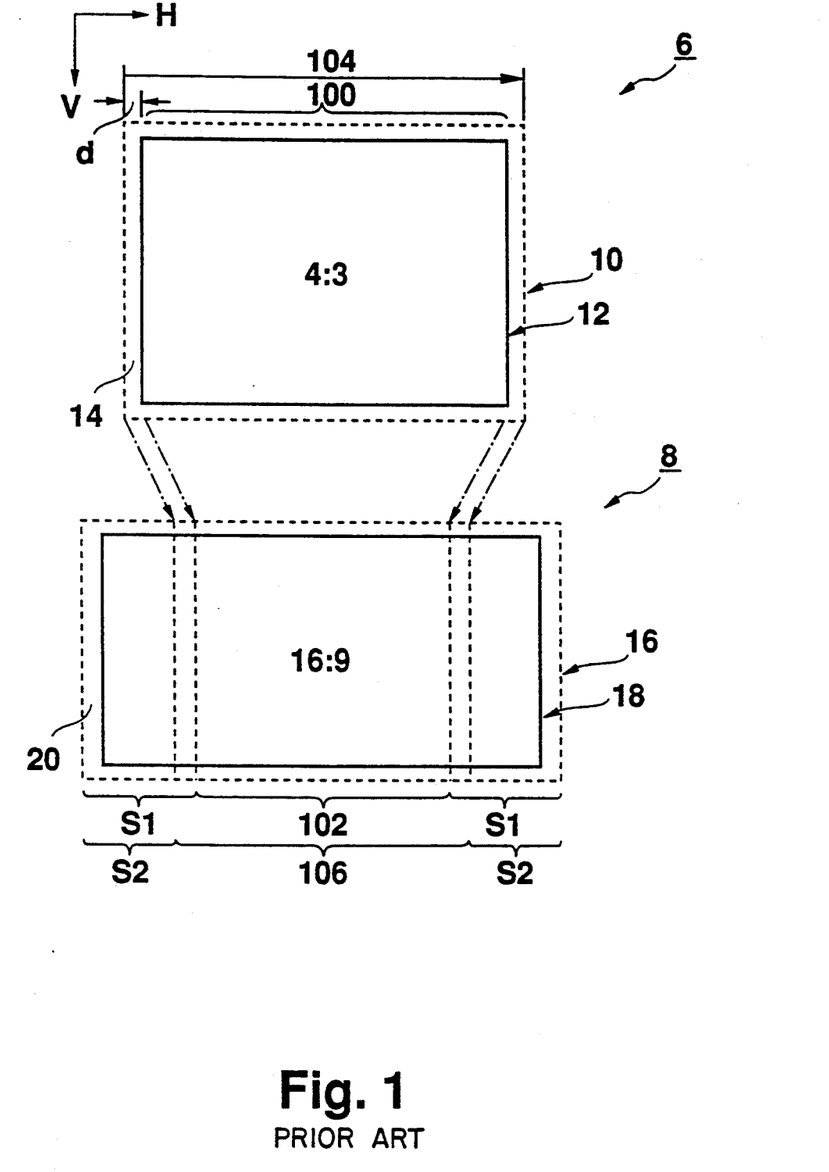
FIG. 1 shows the principle of the conversion of an aspect ratio.

FIG. 1 shows a picture 6 having an aspect ratio of 4:3 and a picture 8 having an aspect ratio of 16:9.

In the picture 6, a picture region 10 (surrounded by the broken lines) is a region in which picture information can exist as video signals. A display region 12 (surrounded by the solid lines) is a region in which a picture is actually displayed on a TV picture display unit, and an overscanning region 14 is a region in which a picture is not displayed on the display unit. In the display unit, the ratio of the horizontal width and the vertical width of the display region 12 is ordinarily set to be 4:3 as the picture region 10.

In the picture 8 having a wide aspect ratio, the reference numeral 20 represents an overscanning region. Among the picture information in a picture region 16, only the picture information in a display region 18 is actually displayed.

As a system for converting the picture 6 having an aspect ratio of 4:3 into the picture 8 having an aspect ratio of 16:9, a "side panel system" is conventionally known.

In this system, as shown in FIG. 1, the picture region 10 is first compressed equally both in the horizontal direction (H) and the vertical direction (V), as shown in FIG. 1. In this case, in the conventionally known "cut mode" in the side panel system, both ends of the picture region 10 in the horizontal direction are first cut by a predetermined width d, and the picture information in the remaining region (period) 100 is compressed.

It is because there are a few TV signals with a part of the picture information missing at both side ends of a picture at the start and end (right and left ends in the picture region 10) of one horizontal scanning period 104 that both ends of the picture region 10 are cut at the predetermined width d.

By the above-described compression of the picture, the picture information in a partial region 102 of the wide picture region 16 is obtained. However, there is no picture information in both side regions S1 of the region 102.

As a countermeasure, a side panel image having a predetermined luminance (generally gray or black) is inserted into the regions S1, thereby constituting a picture having an overall aspect ratio of 16:9.

Figure 2:
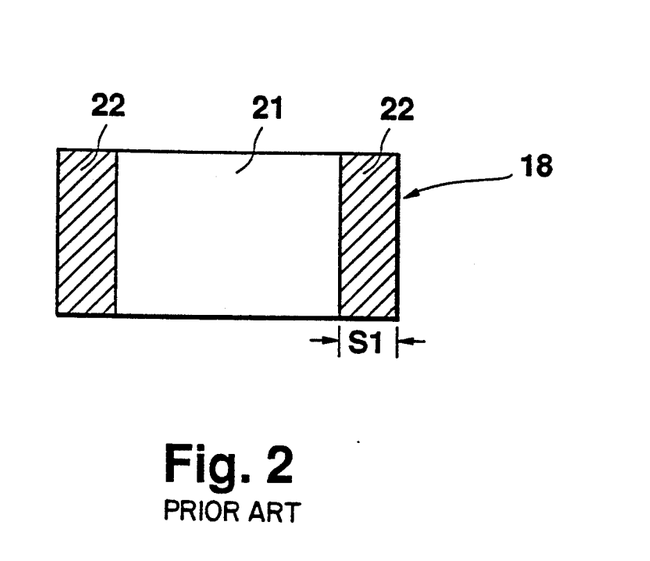
FIG. 2 shows an example of the display of a picture including side panel images.

FIG. 2 shows an example of a display in the cut mode in the side panel system. On both sides of a compressed picture 21, a side panel image 22 having a predetermined luminance is displayed.

In FIG. 1, the ratio of the horizontal width and the vertical width of the compressed picture in the horizontal direction in the actual displaying region (the overlapping portion of the region 18 and the region 102) is set to be 4:3 in most cases in the same way as the aspect ratio of the picture 6. In order to realize the ratio of 4:3 the cut width d is determined in correspondence with the amount of overscanning in the vertical direction.

Figure 3:
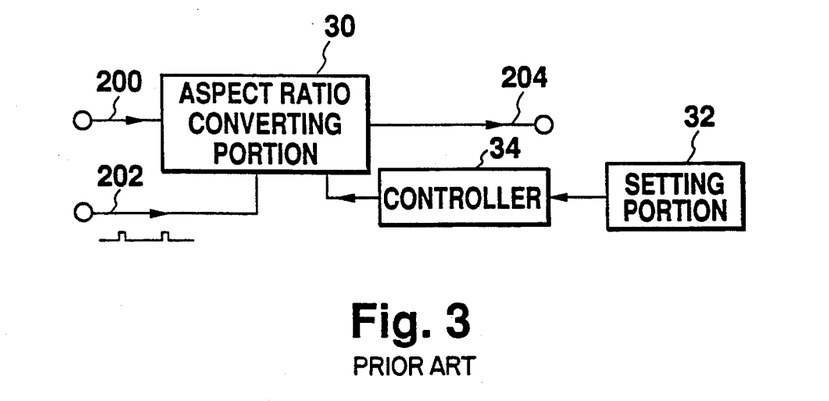
FIG. 3 is a block diagram of the structure of a conventional aspect ratio converting apparatus.

FIG. 3 shows a conventional aspect ratio converting apparatus.

In FIG. 3, a video signal 200 and a horizontal synchronization signal 202 are input to an aspect ratio converting portion 30. The aspect ratio converting portion 30 inputs a picture having an aspect ratio of 4:3 and outputs a picture having an aspect ratio of 16:9 by compressing the picture and adding side panel images thereto.

A setting portion 32 is composed of a ROM, etc., and stores the set value of the horizontal width of the region 100 (see FIG. 1). A controller 34 composed of a microcomputer, etc. reads the set value from the setting portion 32 and controls the aspect ratio converting portion 30.

If a TV signal is a luminance and color difference system, two systems of aspect ratio apparatuses are necessary, and if a TV signal is an RGB system, three systems thereof are necessary.

The above-described side panel system, however, suffers from the following problems. In the above-described cut mode, the horizontal width of the side panel image is enlarged, as shown in FIG. 2. Although there are actually many TV signals for picture information in the region having the predetermined width d shown in FIG. 1, both ends of the picture are uniformly cut in the cut mode and the width of the side panel image is therefore enlarged by the width corresponding to the cut width. In addition, the important picture information existing in the cut region is discarded.

To eliminate this problem, the present inventors have devised a "wide mode". This is a method of displaying all the picture information in the horizontal scanning period 104 without cutting the ends of the picture region 10. By adopting this mode, it is possible to reduce the horizontal width of the side panel image.

In the wide mode, however, if there is no picture information at the side ends of the picture, the following problem occurs.

Figure 4:
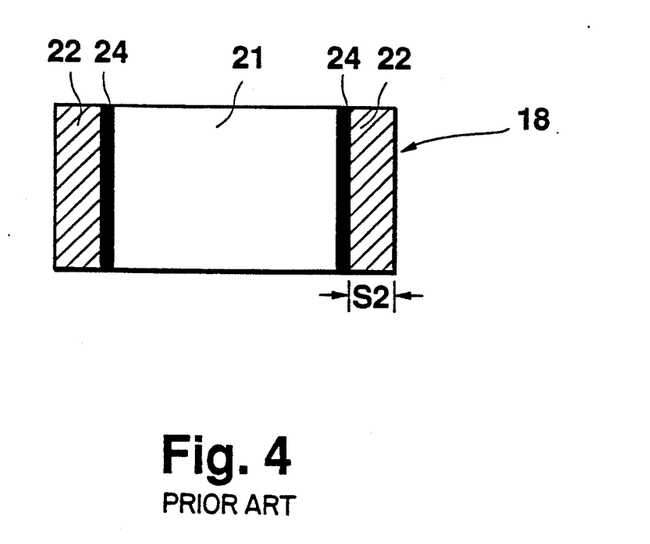
FIG. 4 shows a black line occurring on the boundary between a narrow side panel image and the actual picture.

FIG. 4 shows an example of a display in the wide mode. In the wide mode, a side panel image 22 having a smaller width is inserted into a region S2. If there is no picture information at the side ends of the picture region 10, an offensive black line 24 indicating that there is no data is displayed on the boundary between the compressed picture 21 and the gray side panel image 22.

Conventional aspect ratio converting apparatus of the side panel system are disclosed, for example, in Japanese Patent Laid-Open Nos. Hei 2-152380 and Hei 2-92077. In these apparatuses, the aspect ratio is converted without distorting the picture by adding a side panel image to the vacant picture region.

In neither of these apparatuses, however, is the case in which there is no information at the side ends of a picture or the case in which there is picture information at the side ends of a picture taken into consideration. Therefore, these apparatuses suffer from either of the above-described problems.

Another example of a conventional aspect ratio converting apparatus is that disclosed in Japanese Patent Laid-Open No. Hei 2-107080. This apparatus allows a converting mode to be selected from a plurality of modes. When a first mode is selected (see FIG. 2(a) in the specification), the aspect ratio is converted with some distortion in the picture. When a second mode is selected (FIG. 2(b) in the specification), the aspect ratio is converted by the conventional side panel system. When a third mode is selected (FIG. 2(c) in the specification), the aspect ratio is converted with the upper and lower portions of the original picture partially cut.

In this apparatus, however, neither the case in which there is no information at the side ends of a picture not the case in which there is picture information at the side ends of a picture is not taken into consideration.

SUMMARY OF THE INVENTION

Accordingly, it is an object of the present invention to eliminate the above-described problems in the related art and to provide an aspect ratio converting apparatus and method which allow an appropriate mode in the side panel system to be selected in accordance with the state of video signals.

It is another object of the present invention to provide an aspect ratio converting apparatus and a method which are capable of detecting the available period of a picture in which picture information actually exists.

To achieve this aim, in one aspect of the present invention there is provided an aspect ratio converting apparatus comprising: first means for selecting one of a cut mode and a wide mode; second means for compressing an input signal of the first aspect ratio, the second means for compressing the input signal with beginning and ending portions of predetermined width deleted and outputting a first compressed picture when the cut mode is selected, and for compressing the entire input signal and outputting a second compressed picture when the wide mode is selected; and third means for producing a second picture of a second aspect ratio by adding a side panel image of a first predetermined width to beginning and ending portions of the first compressed picture when the cut-mode is selected and a side panel image of a second predetermined width, less than the first predetermined width, to beginning and ending portions of the second compressed picture when the wide mode is selected.

According to this structure, it is possible to freely select the cut mode or the wide mode. Therefore, when there is no picture information on either end of the picture, the cut mode is adopted, thereby preventing the offensive black line (FIG. 4). On the other hand, when there is picture information on either end of the picture, the wide mode is adopted, thereby effectively utilizing the picture information.

In a second aspect of the present invention, there is provided an aspect ratio converting apparatus and method comprising: first means for detecting the available period of a first picture having a first aspect ratio in which picture information actually exists; second means for compressing the picture in the available period of the first picture and outputting a compressed picture; and third means for adding a side panel image to both sides of the compressed picture and outputting a second picture.

According to this structure and method, the available period of the first picture in which picture information actually exists is detected, and the picture in the detected period is compressed. It is therefore possible to effectively utilize the picture information and prevent the occurrence of an offensive black line.

The above and other objects, features and advantages of the present invention will become clear from the following description of the preferred embodiments thereof, taken in conjunction with the accompanying drawings, which is not to be considered limitive of the present invention.

DESCRIPTION OF THE PREFERRED EMBODIMENTS

First Embodiment

Figure 5:
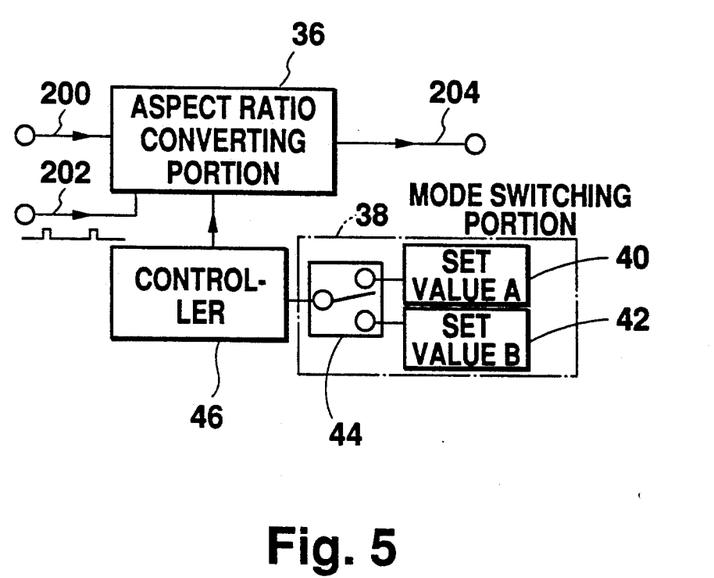
FIG. 5 is a block diagram of the structure of a first embodiment of an aspect ratio converting apparatus according to the present invention.

FIG. 5 is a block diagram of the structure of a first embodiment of an aspect ratio converting apparatus according to the present invention. In FIG. 5, an aspect ratio converting portion 36 inputs a picture having an aspect ratio of 4:3 and outputs a picture having an aspect ratio of 16:9 by compressing the picture (time axis) and adding side panel images thereto. The aspect ratio converting portion 36 inputs a video signal (a signal for a first picture) 200 and a horizontal synchronization signal 202, and outputs a video signal 204 (a signal for a second picture).

A mode switching portion 38 is composed of a first setting device 40 for storing a set value A, a second setting device 42 for storing a set value B, and a switch 44 for selecting the output of the first setting device 40 or the output of the second setting device 42. Each of the first and second setting devices 40, 42 is composed of, for example, a ROM.

The set value A corresponds to the cut mode and the set value B corresponds to the wide mode. Each set value is composed of the address data for the reading starting position and the reading ending position in the horizontal period as the object of compression. The cut mode and the side mode will be described later in detail with reference to FIGS. 8 and 9, respectively.

A controller 46 composed of a microcomputer, etc. reads the selected set value and controls the aspect ratio converting portion 36 on the basis of the set value.

Figure 6:
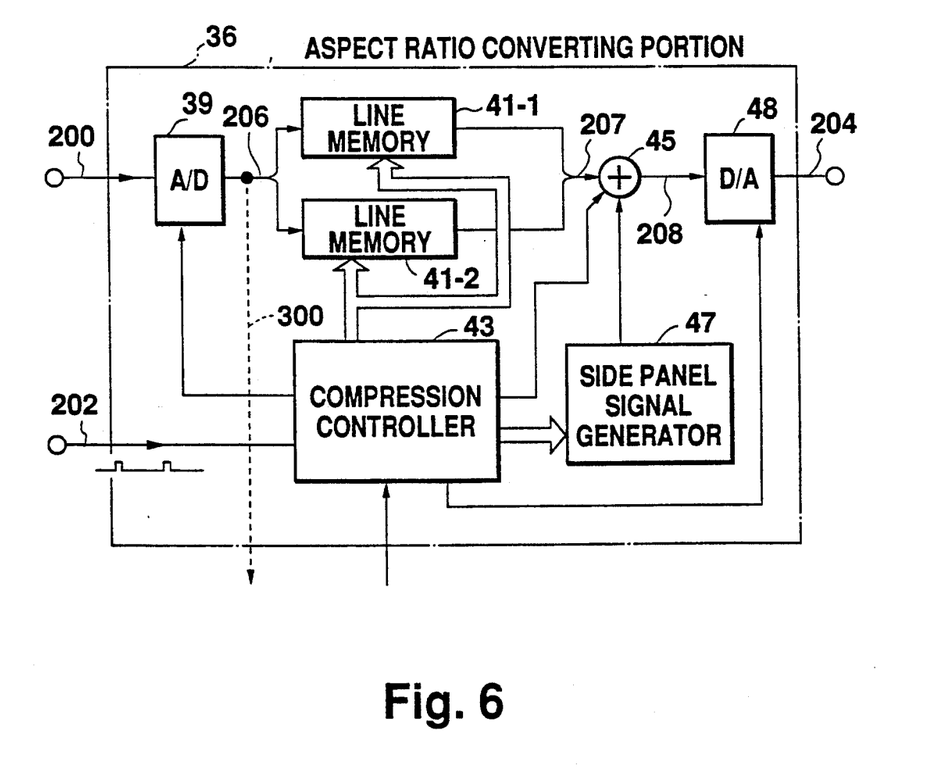
FIG. 6 is a block diagram of the structure of the aspect ratio converting portion in the embodiment shown in FIG. 5.
Figure 7:
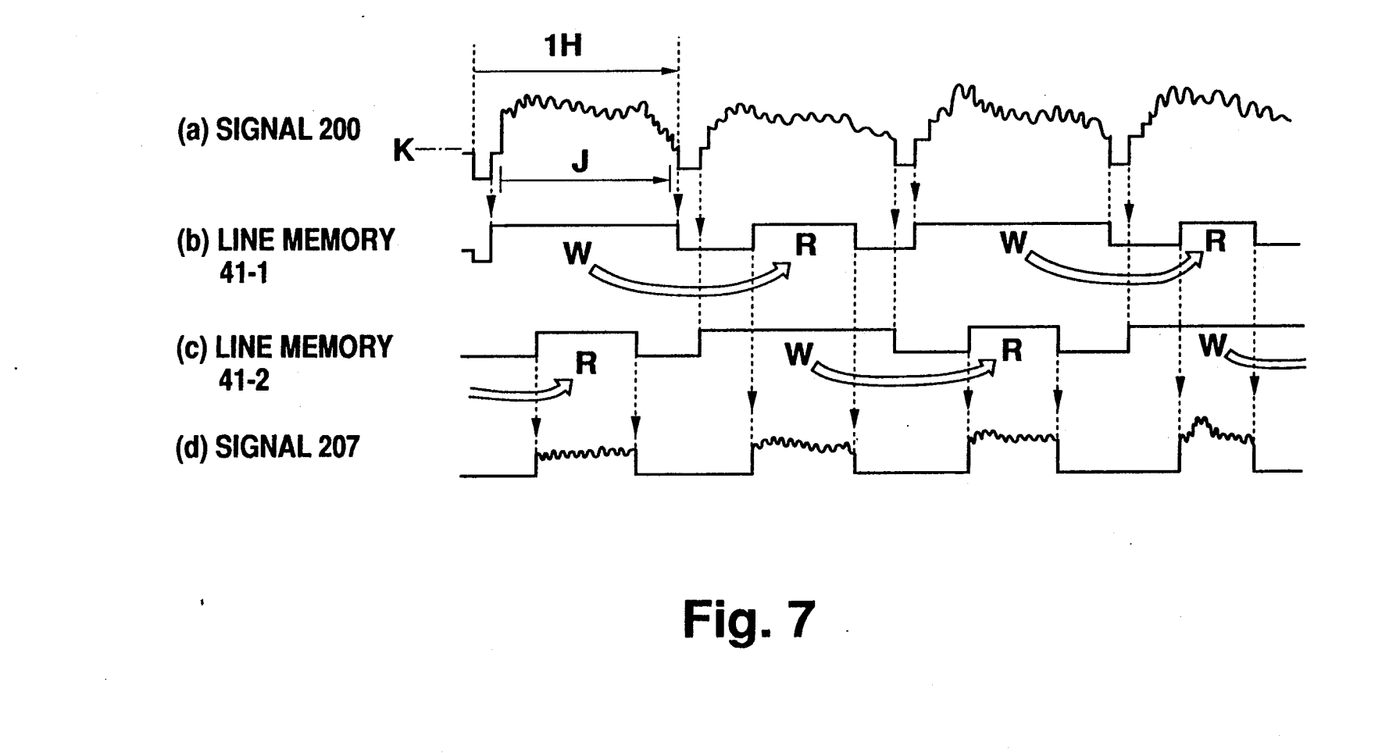
FIG. 7 is a timing chart of the operation of the aspect ratio converting portion shown in FIG. 6.

FIG. 6 shows the actual structure of the aspect ratio converting portion 36, and FIG. 7 is a timing chart of the operation of thereof.

In FIG. 6, the video signal 200 is converted into a digital video signal 206 by an A/D converter 39. The digital video signals 206 in one horizontal scanning period (1H) are alternately stored in a line memory 41-1 and a line memory 41-2. Each line memory temporarily stores the picture information in one horizontal scanning period (1H). In the operation of each of the line memories, 41-1 and 41-2 shown in FIG. 7, the symbol W represents "write" and R "read".

In FIG. 6, the digital video signals 206 which are stored in the line memory 41-1 and 41-2 are alternately read out at a (e.g, 4/3 times) higher frequency than the writing frequency. By increasing the reading frequency in this way, the video signal is compressed (see FIG. 7(d)). The compression ratio is determined by the ratio of the writing speed and the reading speed. The reading operation and the writing operation are controlled by a compression controller 43.

The writing frequency and the reading frequency in the cut mode agree with those in the wide mode. However, the reading starting position (starting address) and the reading ending position (ending address) in the horizontal period in the cut mode are different from those in the wide mode.

A side panel video signal generator 47 is controlled by the compression controller 43 and outputs a side panel video signal having a horizontal width which corresponds to the mode.

An adder 45 adds a side panel video signal to the compressed video signal 207 before and after the compressed video signal 207. By adding the side panel video signal, a picture having an aspect ratio of 16:9 is produced.

A D/A converter 48 converts an output signal 208 of the adder 45 into an analog video signal 204.

A control signal is supplied from the controller 46 (see FIG. 5) to the compression controller 43. The compression controller 43 controls the frequency of the line memory 41, the side panel video signal generator 47 and the adder 45 on the basis of the supplied control signal.

The structure of the aspect ratio controlling portion 36 is the same as that of a conventional one, but this embodiment is characterized functionally by the fact that the aspect ratio controlling portion 36 is operated in two modes.

The cut mode and the wide mode will now be explained.

Figure 8:
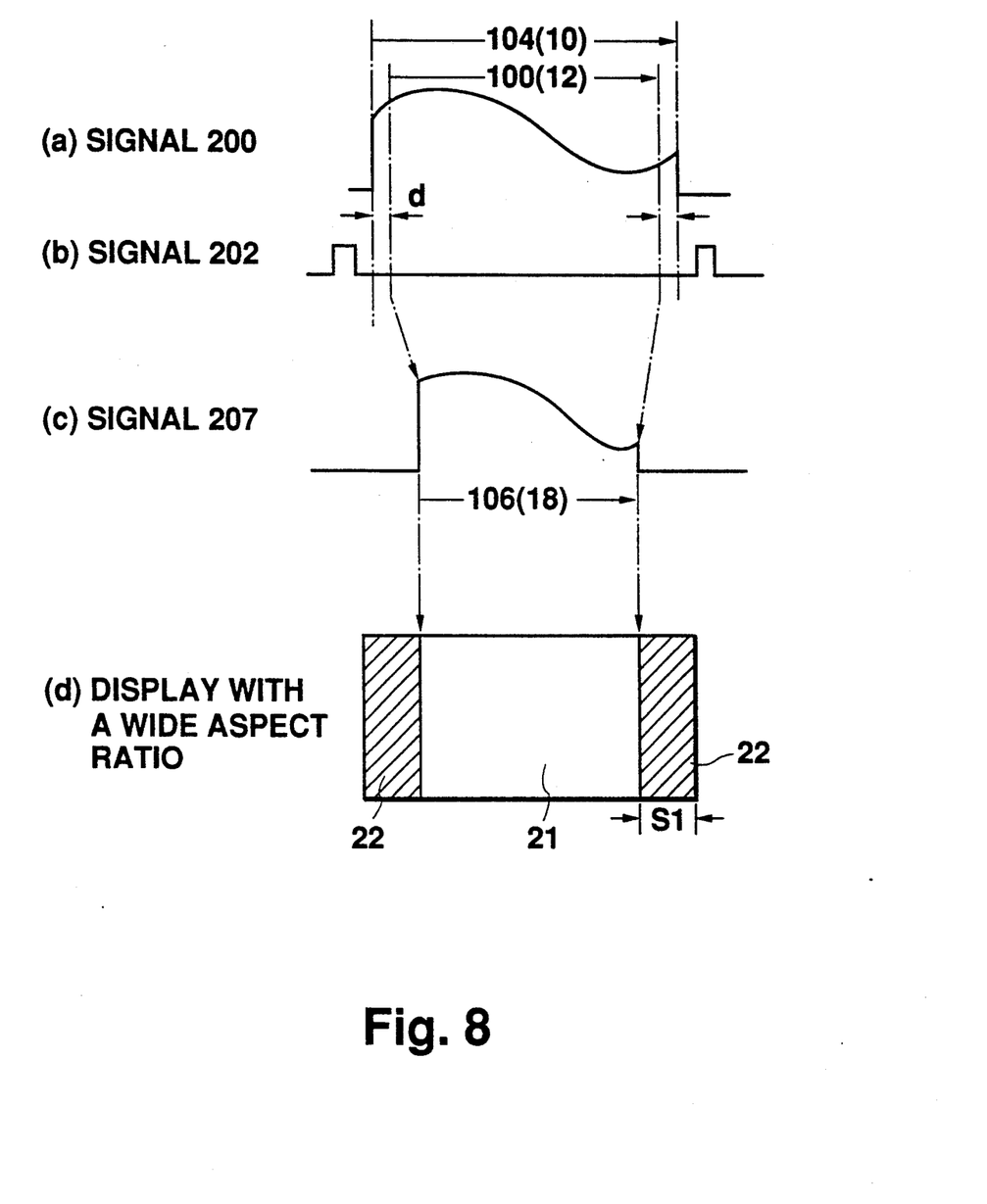
FIG. 8 shows the operation in the cut mode in the side panel system.
Figure 9:
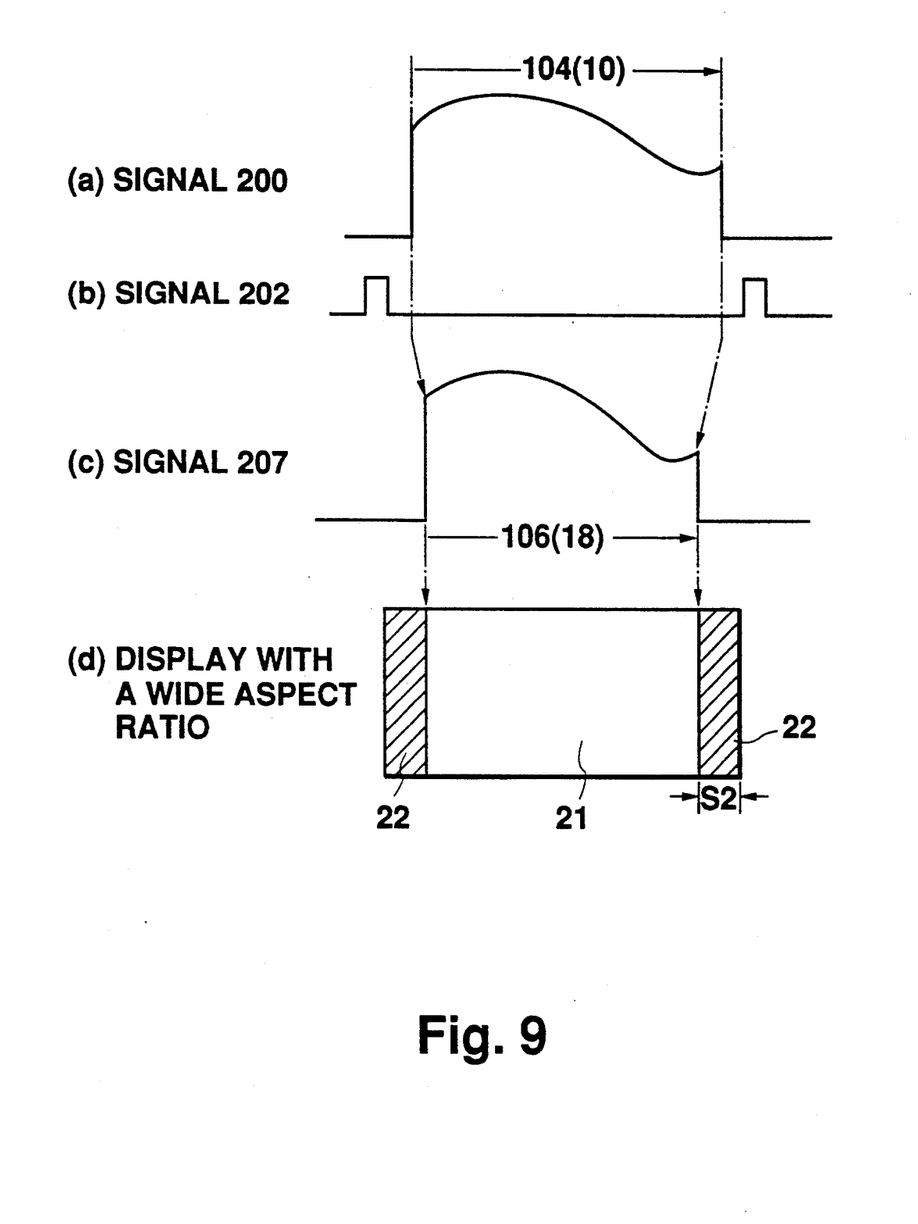
FIG. 9 shows the operation in the wide mode in the side panel system.

FIG. 8 shows the operation in the cut mode, and FIG. 9 shows the operation in the wide mode. FIG. 1 will also be helpful to the understanding of these operations.

In FIG. 8, the reference numeral 104 represents the horizontal period of the picture region 10. The reference numeral 100 represents the horizontal period of the display region 12, and the symbol d represents an overscanning period. In a TV picture display unit of the current NTSC system, the picture information in the period 100 is displayed.

In the cut mode, the picture information in the period 100 is compressed to form the compressed video signal 207. In the structure shown in FIG. 6, the picture (time axis) is compressed by reading the video signal at a high speed from the line memory 41. Both ends of the period 104 are cut at the predetermined width d by delaying the start of reading and advancing the end of reading.

As shown in FIG. 8(d), the side panel image 22 is added to both sides of the compressed picture 21. In this way, a wide picture having a converted aspect ratio is displayed on the display unit.

In the wide mode shown in FIG. 9, all the picture information in the period 104 is compressed to produce a compressed picture. Neither end of the picture region 104 is cut, and all the picture information in the picture region 10 is displayed. (It goes without saying that the overscanning region in the vertical region is not displayed.)

As shown in FIG. 9(d), in the wide mode, no part of the picture information of the first picture is cut, so that all the picture information in the picture region 10 is displayed. In addition, it is possible to reduce the width of the side panel image compared with the in the cut mode.

As explained above, according to the first embodiment, it is possible to select the cut mode or the wide mode as desired.

It is therefore possible to eliminate the problem shown in FIG. 4 by adopting the cut mode to a picture which has or may have no picture information on both sides of the picture information.

On the other hand, the wide mode is adopted to a picture which has picture information on both sides of the picture region so as to effectively utilize the picture information. It is thus possible to display a picture having a narrow side panel image, in other words, a substantially wide picture.

Second Embodiment

Figure 10:
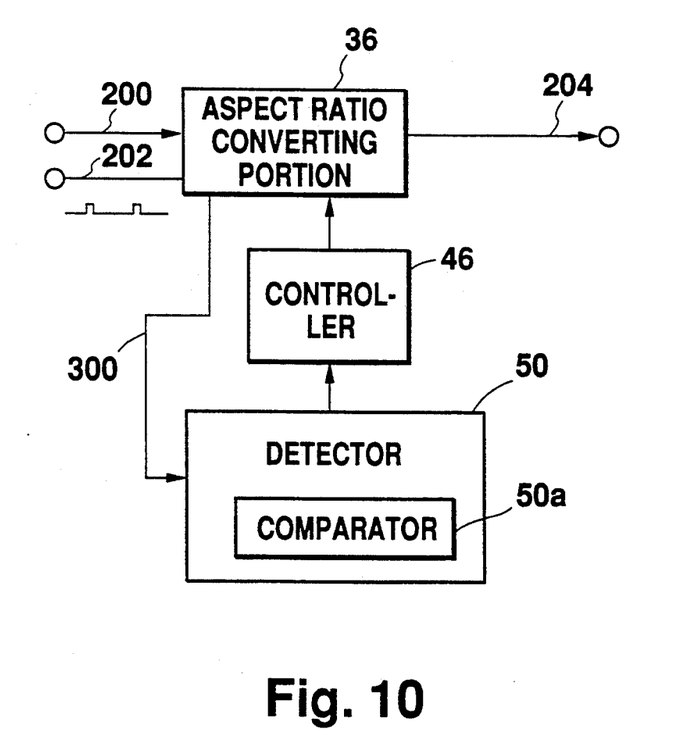
FIG. 10 is a block diagram of the structure of a second embodiment of an aspect ratio converting apparatus according to the present invention.

FIG. 10 shows the structure of a second embodiment. This embodiment is different from the first embodiment in that the horizontal region in which picture information actually exists is detected as the object of compression.

In other words, if there is no picture information at the side ends of a picture, the size of the side panel image is varied in correspondence with the portion in which there is no picture information, so that a picture having a wide overall aspect ratio is constantly produced. This will be explained in more detail hereinunder.

A digital video signal 300 (represented by a broken line 300 in FIG. 6) obtained by A/D conversion is supplied from the aspect ratio converting portion 36 to a detector 50. The A/D converter 39 may naturally be provided within the detector 50.

The detector 50 compares the digital video signal 300 with a reference value K (see FIG. 7). At this time, a comparator 50a stores in the internal memory the address of the first digital video signal 300 which exceeds the reference value K in the horizontal period. The comparator 50a also stores the address of the last signal 300 which is greater than or equal to K (the first signal 300 which is not lower than the reference value K). The address storing operation is executed on every scanning line and for a plurality of pictures as a rule.

The starting address and the ending address are finally judged on the basis of the plurality of stored addressed. In judging these addresses, an averaging technique is adopted after noise is removed.

The period between the starting address and the ending address is a region in which picture information actually exists, namely, an available period. The controller 46 reads the available region and controls the aspect ratio controlling portion 36.

The aspect ratio controlling portion 36 compresses the picture information in the available period J (see FIG. 7) in one horizontal scanning period. A side panel image is inserted to the vacant region on both sides of the compressed picture. As a result, the width of the side panel image is not fixed in the second embodiment, and it is automatically set in correspondence with the available period.

According to the second embodiment, since it is possible to display all the picture information in the available period, no picture information is missing. In addition, it is not necessary to set the size of the side panel image manually.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An aspect ratio converting apparatus for producing a second picture having a second aspect ratio from a first picture having a first aspect ratio, said apparatus comprising:
   (a) first means for selecting one of a cut mode and a wide mode;
   (b) second means for compressing an input signal of the first aspect ratio at a same compression ratio in a vertical direction and in a horizontal direction, said second means compressing said input signal, with beginning and ending portions of a predetermined width deleted, and outputting a first compressed picture when the cut mode is selected, and said second means compressing the entire input signal and outputting a second compressed picture when the wide mode is selected; and
   (c) third means for producing a second picture of a second aspect ratio by adding a side panel image of a first predetermined width to beginning and ending portions of said first compressed picture when the cut mode is selected and by adding a side panel image of a second predetermine width to beginning and ending portions of said second compressed picture when the wide mode is selected, the first predetermined width being greater than the second predetermined width.

2. The aspect ratio converting apparatus of claim 1, wherein said first aspect ratio is 4:3, and said second aspect ratio is 16:9.

3. The aspect ratio converting apparatus of claim 2, wherein said second means includes:
   an A/D converter for converting the input video signal from analog to digital;
   two line memories for alternately storing the digital input video signals converted by said A/D converter;
   a side panel image generator for generating a video signal for said side panel image;
   an adder for adding said video signal for said side panel image to said digital video signal output from said two line memories;
   a D/A converter for converting the digital signals output from said adder into analog signals; and
   a compression controller for controlling each of said two line memories so that said digital input video signals stored therein are read out at a frequency to produce a compressed picture corresponding to the selected one of the cut and wide modes.

4. The aspect ratio converting apparatus of claim 3, wherein said side panel image generator generates a side panel image having a predetermined luminance.

5. An aspect ratio converting apparatus for producing a second picture having a second aspect ratio from a first picture of a first aspect ratio, said apparatus comprising:
   (a) first means for comparing an input video signal of the first aspect ratio to a predetermined reference value identifying a beginning and an ending portion of the input video signal which is less than the predetermined reference value to thereby detect an available period of said input signal in a horizontal direction;
   (b) second means for compressing the input video signal in said available period at the same compression ratio in the vertical direction and in the horizontal direction, said available period corresponding to portions of the input signal at least equal to the predetermined reference value; and
   (c) third means for adding a side panel image to the compressed input video signal at the identified beginning and end portions of the input video signal to produce said second picture of the second aspect ratio.

6. The aspect ratio converting apparatus according to of claim 5, wherein said first aspect ratio is 4:3, and said second aspect ratio is 16:9.

7. The aspect ratio converting apparatus of claim 6, wherein said second means includes:
   an A/D converter for converting the input video signal from analog to digital;
   two line memories for alternately storing digital input video signals converted by said A/D converter;
   a side panel image generator for generating a video signal for said side panel image;
   an adder for adding said video signal for said side panel image to said digital video signal output from said two line memories;
   a D/A converter for converting the digital signals output from said adder into analog signals; and
   a compression controller for varying data reading frequencies of said two line memories in correspondence with said available period to compress the input video signal during said available period.

8. The aspect ratio converting apparatus of claim 7, wherein said side panel image generator generates a side panel image having a predetermined luminance.

9. An aspect ratio converting apparatus for converting a first picture of a first aspect ratio to a second picture of a second aspect ratio, comprising:
   comparison means for comparing an input video signal to a predetermined reference value;
   storage means, operatively connected to the comparison means, for storing a first address of the input video signal upon the comparison indicting that the input video signal is at least equal to the predetermined reference value, the storage means subsequently storing a second address previous to an address of the input video signal wherein the comparison indicates that the input video signal is less than the predetermined reference value;

aspect ratio converting means, operatively connected to the storage means and comparison means, for converting the input video signal of a first picture having a first aspect ratio to a second picture having a second aspect ratio by adding a first side panel to the input video signal at an address prior to the stored first address and a second side panel at an address subsequent to the stored second address.

10. The aspect ratio converting apparatus of claim 9, wherein the aspect ratio converting means includes compression controller means, for compressing the input video signal at addresses between the stored first and second addresses, the compressed input video signal being added to the side panels to produce the second picture of the second aspect ratio.

11. The aspect ratio converting apparatus of claim 9, wherein the input video signal is sequentially input one horizontal line at a time, the aspect ratio converting means, storage means, and control means each operating on each sequentially input horizontal line.

12. The aspect ratio converting apparatus of claim 9, wherein the first aspect ratio is 4:3 and the second aspect ratio is 16:9.

13. The aspect ratio converting apparatus of claim 10, wherein the aspect ratio converting means includes at least one memory for storing the input video signal at a first rate and for outputting the input video signal at a second rate, faster than the first rate, to thereby achieve compression of the input video signal.

14. The aspect ratio converting apparatus of claim 13, wherein the at least one memory includes a line memory for storing a horizontal line of the input video signal, sequentially.

15. An aspect ratio converting method for converting a first picture of a first aspect ratio to a second picture having a second aspect ratio, comprising the steps of:
(a) comparing an input video signal to a predetermined reference value;
(b) storing a first address of the input video signal upon the comparison of step (a) indicating that the input video signal is at least equal to the predetermined reference value, and subsequently storing a second address previous to an address of the input video signal upon the comparison of step (a) indicating that the input video signal is less than the predetermined reference value;
(c) converting the input video signal of a first picture having a first aspect ratio to a second picture having a second aspect ratio by adding a first side panel to the input video signal at an address prior to the stored first address and a second side panel at an address subsequent to the stored second address.

16. The aspect ratio converting method of claim 15, wherein step (c) includes:
(1) compressing the input video signal at addresses between the stored first and second addresses;
(2) adding the compressed input video signal to the side panels to produce the second picture of the second aspect ratio.

17. The aspect ratio converting method of claim 15, wherein the input video signal is sequentially input one horizontal line at a time.

18. The aspect ratio converting method of claim 15, wherein the first aspect ratio is 4:3 and the second aspect ratio is 16:9.

19. The aspect ratio converting method of claim 16, wherein step (c) (1) includes compressing the input video signal at a same rate in the horizontal and vertical directions.

* * * * *